United States Patent
Miron et al.

(10) Patent No.: US 10,609,060 B2
(45) Date of Patent: *Mar. 31, 2020

(54) CLUSTERING NETWORK ADDRESSES

(71) Applicant: PayPal, Inc., San Jose, CA (US)

(72) Inventors: Noa Miron, San Jose, CA (US); Doron Hai-Reuven, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/293,554

(22) Filed: Mar. 5, 2019

(65) Prior Publication Data
US 2019/0207970 A1    Jul. 4, 2019

Related U.S. Application Data

(63) Continuation of application No. 15/419,786, filed on Jan. 30, 2017, now Pat. No. 10,225,274.

(51) Int. Cl.
*H04L 29/06* (2006.01)
*H04L 29/08* (2006.01)
*H04L 29/12* (2006.01)
*G06F 21/55* (2013.01)

(52) U.S. Cl.
CPC .......... *H04L 63/1425* (2013.01); *H04L 63/10* (2013.01); *H04L 63/101* (2013.01); *H04L 63/1483* (2013.01); *H04L 67/22* (2013.01); *G06F 21/552* (2013.01); *G06F 2221/2111* (2013.01); *H04L 61/6068* (2013.01); *H04L 2463/121* (2013.01)

(58) Field of Classification Search
CPC . H04L 63/1425; H04L 63/10; H04L 63/1483; H04L 67/22; H04L 61/6068; H04L 2463/121; G06F 2221/2111
See application file for complete search history.

(56) References Cited

U.S. PATENT DOCUMENTS

| 8,793,255 B1* | 7/2014 | Bilinski ........... G06Q 10/06393 707/740 |
| 9,942,186 B2* | 4/2018 | Herger ..................... H04L 51/22 |
| 2005/0102395 A1* | 5/2005 | Falcon ............... G06Q 10/0875 709/224 |
| 2009/0328208 A1* | 12/2009 | Peters ..................... G06F 21/51 726/22 |

(Continued)

*Primary Examiner* — Ghodrat Jamshidi
(74) *Attorney, Agent, or Firm* — Maschoff Brennan

(57) ABSTRACT

A method may include identifying a shared usage of a first network address and a second network address in a predetermined period of time. The method may also include clustering the first network address and the second network address based on the shared usage. The method may include determining a weighting factor between the first network address and the second network address based on the shared usage. The method may further include receiving a request that includes the second network address from a client device. The method may include determining that the request for the electronic activity does not include suspicious activity based on the first network address and the second network address being in the cluster. The method may further include permitting the electronic activity based on the determination that the request for the electronic activity does not include suspicious activity.

18 Claims, 6 Drawing Sheets

(56) References Cited

U.S. PATENT DOCUMENTS

| | | | |
|---|---|---|---|
| 2011/0185421 A1* | 7/2011 | Wittenstein | G06F 21/554 726/22 |
| 2012/0147889 A1* | 6/2012 | Lee | H04L 29/08846 370/392 |
| 2013/0124756 A1* | 5/2013 | Voronel | H04L 63/126 709/239 |
| 2014/0280902 A1* | 9/2014 | Szamonek | H04L 61/2061 709/224 |
| 2016/0014677 A1* | 1/2016 | Chen | H04W 4/21 455/434 |
| 2017/0230293 A1* | 8/2017 | Meredith | H04L 47/12 |

* cited by examiner

CLUSTERING NETWORK ADDRESSES

CROSS-REFERENCE TO RELATED APPLICATIONS

This application is a continuation of U.S. patent application Ser. No. 15/419,786, filed on Jan. 30, 2017, now U.S. Pat. No. 10,225,274, issued on Mar. 5, 2019; the disclosure of which is incorporated by reference herein.

FIELD

The disclosed embodiments are generally related to clustering network addresses.

BACKGROUND

Aspects of computer networking may be vulnerable to cyberattacks. Applicant recognizes a need for increased cybersecurity in computer networks.

The disclosed subject matter is not necessarily limited to embodiments that solve any disadvantages or that operate in particular environments. This background illustrates one example technology area where some disclosed embodiments may be practiced.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
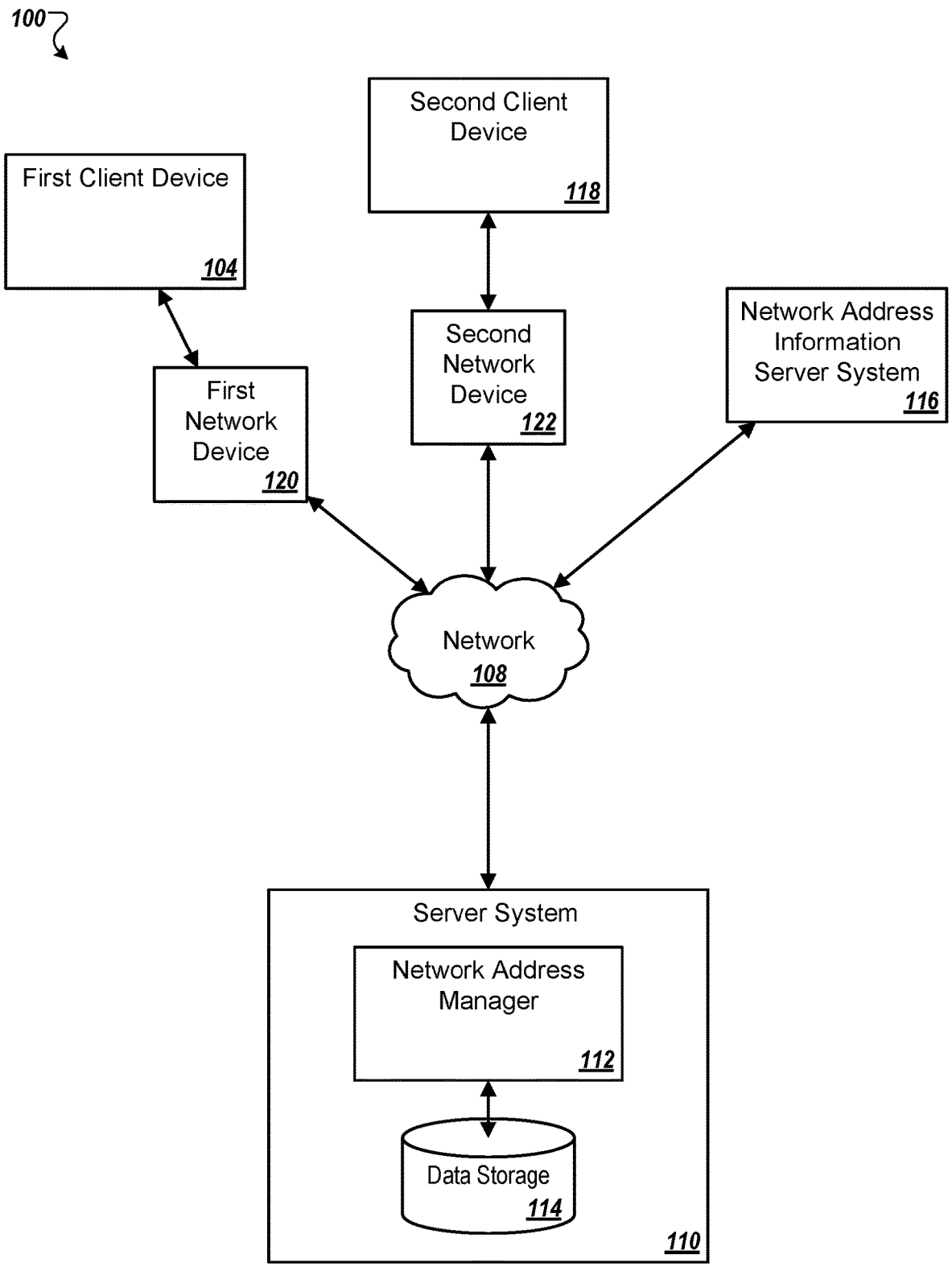
FIG. 1 illustrates an example network architecture.

Various aspects of computer networking may be vulnerable to cyberattacks. In some instances, cybersecurity may be improved by being able to identify whether to trust network addresses from which requests to conduct electronic activity may be received.

Aspects of the present disclosure address use intelligence around network addresses to improve cybersecurity by helping identify trusted network addresses. A system may generate clusters of network addresses to identify network addresses that are likely trustworthy. The system may generate a weighting factor for one or more network addresses to further identify trustworthiness. In some embodiments, the system may identify trusted clusters.

More specifically, techniques described herein may use network addresses to understand various activities of client devices and users. Some activities, client devices, users, network addresses, and/or the like may be more trustworthy than others. For example, intelligence related to a network address and related data may be used by a system to try to assess whether a request to access a service provider system includes suspicious activity. In a specific example, the system may receive a request from a client device to initiate electronic activity with a service provider system. The request may include a network address associated with the client device. Based on a determination that the network address is within a cluster of network addresses that has been identified based on previous activity, the system may grant the request to initiate the electronic activity with the service provider system. The system may also grant the request to initiate the electronic activity with the service provider system based on a weighting factor between the network address and one or more other network addresses within the cluster of network addresses. The weighting factor may be indicative of a relationship between two or more network addresses, where a higher weighting factor may indicate a stronger relationship and a lower weighting factor may be indicative of a weaker relationship. In at least one embodiment, the system may grant the request in response to the weighting factor being above a threshold value.

In another example, the system may determine that the request includes a new network address that has not previously been associated with the client device. The system, however, may have data around the new network address that indicates that the new network address is associated with network addresses that includes other network addresses previously used by the client device (or user, or user account). In response to determining that the new network address is associated with one or more previous network addresses, the system may determine that the electronic activity from the client device does not include suspicious activity. Additionally, the new network address may be included in or added to the cluster if the new network address is associated with one or more previous network addresses and the system determines that the electronic activity from the client device does not include suspicious activity. The system may permit the electronic activity based on the new network address being in the cluster. In another example, the new network address may not be part of the cluster of network addresses at the time the system receives the request. The system, however, may use the data around the new network address that indicates that the new network address is to be added to the cluster of network addresses. The system may add the new network address to the cluster of network addresses and may also grant the request to initiate the electronic activity with the service provider system.

In the present disclosure, reference to initiating an electronic activity with a service provider system or requesting to initiate an electronic activity with a service provider system may include any type of communication with the service provider system that may be configured to engage with the service provider system through the communication of data to or from the service provider system. Additionally, the communications associated with initiating an electronic activity with a service provider system or requesting to initiate an electronic activity with a service provider system may correspond to part of or establishing a communication session with service provider system in which data may be communicated to or from the service provider system.

FIG. 1 illustrates an example network architecture 100 in which embodiments of the present disclosure may be implemented. The network architecture 100 may include a first client device 104, a second client device 118, a network 108, a server system 110, a network address information system 116, and a first network device 120. As discussed in detail below, the network architecture 100 may be configured to identify clusters of network addresses that may be deemed trustworthy. Additionally or alternatively, the network architecture 100 may be configured to treat electronic activity requests based on network addresses associated with the electronic activity requests and the relationships of those network addresses with the network address clusters.

The first client device 104 and the second client device 118 may include a computing device such as personal computer (PC), laptop, mobile phone, smart phone, tablet computer, netbook computer, e-reader, personal digital assistant (PDA), cellular phone, wearable device, an activity monitor, etc. The network architecture 100 may include any number client devices, including the first client device 104 and the second client device 118.

The network 108 may include a public network (e.g., the Internet), a private network (e.g., a local area network (LAN) or wide area network (WAN)), a wired network (e.g., Ethernet network), a wireless network (e.g., an 802.xx network or a Wi-Fi network), a cellular network (e.g., a Long Term Evolution (LTE) or LTE-Advanced network), routers, hubs, switches, server computers, and/or a combination thereof. The network 108 may link multiple computing devices together in order to share resources. Each computing device may be connected to the network 108 using a wired or wireless connection. In some embodiments, the first client device 104 and the second client device 118 may be connected to the network 108 via one or more network devices. In the illustrated example, the first client device 104 is connected to a first network device 120, which is connected to the network 108. Similarly, in the illustrated example, the second client device 118 is connected to a second network device 122, which is connected to the network 108.

The network devices 120 and 122 may include any suitable system, apparatus, or device configured to provide an interface and operate according to protocols in a manner that allows a device to communicate over the network 108. Examples of the network devices 120 and 122 include a gateway, modem, router, base station, a proxy server, or any other type of networking device.

A network address may be assigned to each computing device that is connected to the network 108. For example, the first client device 104 and the second client device 118 may each be assigned a network address. The network address may include an identifier of a machine in a particular network (e.g., network 108). For example, when the network 108 is the Internet, the network address may include an Internet Protocol (IP) address. Network addresses, such as IP addresses, may include numbers assigned to every computer or device that connects to the network 108. Some network addresses may be public while other network addresses may be private. Public network addresses are typically accessible via a public network, such as the Internet, and are typically guaranteed to be unique. Private network addresses are typically accessible from within the private networks to which they belong.

In embodiments that include the network devices 120 and 122, the network devices 120 and 122 may each be assigned respective public network addresses in the network 108. Further, the network devices 120 and 122 may provide an interface for client devices within a private network created by the network devices 120 and 122 and a public network (e.g., network 108). The network devices 120 and 122 may each assign private network addresses to client devices within their respective private networks. Outside of the private network, the client devices may be associated with the public network address of the network device to which they are connected. For example, the first client device 102 may be publicly assigned the network address of the first network device 120. Similarly, the second client device 118 may be publicly assigned the network address of the second network device 122.

The network devices 120 and 122 may each include a routing table or network address translation logic to forward communications between client devices within the private network and client devices outside of the private network. The first network device 120 may route communications between the first client device 104 and another device outside of the private network. For example, the first network device 120 may receive a communication intended for the first client device 104 that is addressed to the public network address of the first network device 120. The first network device 120 may translate the public network address to a private address of the first client device 104. The first network device 120 may send the communication to the private address of the first client device 104.

An example system may include a private corporate or home network that resides behind a network device, such as the first network device 120 or the second network device 122. In response to the first client device 104 being assigned a private network address, other local devices (not illustrated) in the private network may see the first client device 104 via its private network address. However, devices residing outside of the private network may not directly communicate with the first client device 104 via the private network address. Instead, devices residing outside of the private network send communications to the public network address of the first network device 120. The first network device 120 may include logic to route the communications to the intended device within the private network.

Network addresses may be dynamic or static. Dynamic network addresses are typically issued to a computing device (e.g., a client device, a network device) using a leasing system. This typically means that that network address is active for the computing device for a limited time. In response to the lease expiring, the computing device typically requests a new lease from a central address authority. Sometimes, the computing device may receive a new network address—especially if the computing device was disconnected from the communication network between leases. This process is usually transparent to an end-user.

The network address information system 116 may store information pertaining to a network address. The information pertaining to the network address may include a location associated with a network address, an owner of the network address (e.g., private, corporate, or public owner), and/or a type of network address (e.g., internet service provider (ISP), mobile, spoof (e.g., proxy, virtual private network (VPN), TOR), etc.). The network address information system 116 may receive a request for information of one or more network addresses. In response to receiving such a request, the network address information system 116 may provide some or all of the information pertaining to the one or more network addresses.

The server system 110 and the network address information system 116 may each include one or more computing devices, such as a rackmount server, a router computer, a server computer, a personal computer, a mainframe computer, a laptop computer, a tablet computer, a desktop computer, etc., data stores (e.g., hard disks, memories, databases), networks, software components, and/or hardware components.

The server system 110 may be associated with a service provider that may provide any of various network accessible services such as for example, financial services, e-commerce services, data storage services, data processing services, entertainment services, informational services, educational services, etc. In some embodiments, the server system 110 may be configured as a service provider server system that includes one or more computing systems configured to perform operations related to providing the network accessible services of the service provider. In at least one embodiment, the server system 110 includes a separate server as the service provider server, where the server system 110 may handle access determinations for the service provider server.

The server system 110 may include a network address manager 112. The network address manager 112 may be configured to perform one or more operations related to determining relationships between network addresses and treatment of electronic activity requests based on the determined relationships. In some embodiments, the network address manager 112 may be implemented using software that includes code and routines configured to enable a computing system to perform operations. Additionally or alternatively, the network address manager 112 may be implemented using hardware and the hardware may include a processor, a microprocessor (e.g., to perform or control performance of one or more operations), a field-programmable gate array (FPGA), or an application-specific integrated circuit (ASIC). In some other instances, the network address manager 112 may be implemented using a combination of hardware and software. In the disclosure, operations described as being performed by the network address manager 112 may include operations that the network address manager 112 may direct a computing system to perform.

In operation, the network address manager 112 may generate a network address map by determining one or more clusters of network addresses based on relationships between the network addresses, as further described below. The network address manager 112 may use the network address map to determine whether to permit electronic activity.

The network address manager 112 may determine the one or more clusters based on usage history of multiple network addresses. The usage history may include users, accounts, dates, devices, times and durations associated with the usage of a network address. For example, the usage history may indicate that a first user has previously used a first network address at least once during a predetermined period of time. In at least one embodiment, the network address manager 112 may track network address usage over time and store such usage as usage history in a data storage, such as the data storage 114. For example, the network address manager 112 may record network address usage over time of client devices that conduct electronic activity with the system 110. The network address usage over time may be included in the usage history, which may be stored in the data storage 114.

In an example of recording network address usage over time, the first client device 104 may be assigned a first network address while conducting electronic activity with the system 110. For example, the first network address may be a public network address associated with the first network device 120 and the first client device 104 may be connected to the system 110 via the first network device 120 and the network 108. In at least one embodiment, system 110 may receive a first connection request from the first client device 104, and based on the first connection request, the system 110 may identify the first network address and associate the first network address with the first client device 104. The first client device 104 may thus be assigned the first network address while conducting electronic activity with the system 110 in some instances. The network address manager 112 may record this assignment in a first entry of the data storage 114 as part of the usage history. The first entry may indicate the first network address, an identifier of the first client device 104, a user, a user account, a timestamp, and/or a duration or lease period of the first network address, among other information pertaining to usage history of the first network address.

In another example of recording network address usage over time, the network address associated with the first client device 104 may include a dynamic network address. Thus, at a different time, the first client device 104 may be assigned a second network address while conducting electronic activity with the system 110. In an example where the first client device 104 is connected to the network 108 via the first network device 120, the network address of the first network device may change from the first network address to the second network address in response to a lease of the first network address expiring. Additionally or alternatively the first client device 104 may be assigned the second network address in response to the first client device 104 connecting to a different network device. For example, the second network address may be a public network address associated with the second network device 122 and the first client device 104 may be connected to system 110 at the different time via the second network device 122 (instead of via the first network device 120) and the network 108. The first client device 104 may thus be assigned the second network address while conducting electronic activity with the system 110 at the different time in some instances. In at least one embodiment, the second network address may include a public network address of the second network device 122. In at least one embodiment, system 110 may receive a second connection request from the first client device 104, and based on the second connection request, the system 110 may identify the second network address and associate the second network address with the first client device 104. The network address manager 112 may record this assignment of the second network address in a second entry in the data storage 114 as part of the usage history. The second entry may indicate the second network address, the first client device 104, a user, a user account, a timestamp, and/or a duration or lease period of the second network address, among other information pertaining to usage history of the second network address.

Similarly, in another example of recording network address usage over time, the second client device 118 may be assigned a third network address while conducting electronic activity with the system 110. For example, the third network address may be a public network address associated with the second network device 122 and the second client device 118 may be connected to the system 110 via the second network device 122 and the network 108. The second client device 118 may thus be assigned the third network address while conducting electronic activity with the system 110 in some instances. The network address manager 112 may record this assignment of the third network address in a third entry in the data storage 114 as part of the usage history. The third entry may indicate the third network address, the second client device 118, a user, a user account, a timestamp, and/or a duration or lease period of the third network address, among other information pertaining to usage history of the third network address.

In some embodiments, the third network address may be the same as the first network address that was previously assigned to the first client device 104. In an example, the second client device 118 may be connected to the network 108 via the second network device 122. The first network device 120 and the second network device 122 may have dynamic network addresses. Thus, the first network address may be assigned to the second network device 122 after expiration of its assignment to the first network device 120. The first network address may be available for assignment to the second client device 118 for various reasons and under various scenarios. For example, the first network address may be available for assignment because the first client device 104 may no longer be assigned the first network address. The first network address may no longer be assigned to the first client device 104 responsive to a lease expiring, the first client device 104 connecting to another network device, among other scenarios.

In yet another example of recording network address usage over time, the second client device 118 may be assigned a fourth network address while conducting electronic activity with the system 110. The fourth network address may be the same network address as the second network address that was previously assigned to the first client device 104. For example, the second network address may be available for assignment because the first client device 104 may no longer be assigned the second network address, for various reasons such as those described above with respect to the first, second and third network addresses. The network address manager 112 may record this assignment of the fourth network address in a fourth entry in the data storage 114 as part of the usage history. The fourth entry may indicate the fourth network address, the second client device 118, a user, a user account, a timestamp, and/or a duration or lease period of the fourth network address, among other information pertaining to usage history of the fourth network address.

The network address manager 112 may access the stored usage in the data storage 114 to identify usage history for one or more network addresses during the predetermined period of time (e.g., the preceding six months). For example, in some embodiments, the network address manager 112 may be configured to analyze the usage history for shared usage of network addresses.

The network address manager 112 may filter the usage history using various criteria. For example, some of the usage history may be tagged by a system administrator (or automatically) as being suspicious activity. Any usage history and/or network addresses associated with suspicious activity (e.g., current, prior) may be filtered out such that the network address manager 112 may not use filtered out usage history to create a network address map. The network address manager 112 may identify suspicious activity, for example, by analyzing the usage history to detect non-random patterns. Non-random patterns may be detecting using velocity features and/or blacklists.

The network address manager 112 may identify a shared usage of at least two network addresses in a predetermined period of time in the usage history. For example, the network address manager 112 may access the usage history to determine that a first network address has been used by two different users or user devices during the predetermined period of time. The network address manager 112 may identify shared usage by any number of users and/or client devices. In another example, the network address manager 112 may identify a frequent usage of one network address in a predetermined period of time in the usage history. For example, the network address manager 112 may determine that one user has used (or has been associated with) a network address on multiple occasions. In at least one embodiment, the multiple occasions may be separated by usage of another network address by the user.

The network address manager 112 may use the shared usage to generate a cluster of network addresses. The network address manager 112 may cluster network addresses based on shared usage of a network address among one or more users and/or by one or more client devices. For example, the network address manager 112 may determine, based on the usage history, that two or more network address are related to each other based on the usage history indicating that the two or more network addresses have each been associated with the same users and/or client devices. Additionally or alternatively, the network address manager 112 may cluster the two or more network addresses based on the determination that they are related to each other. The network address manager 112 may use usage patterns of the network addresses to define one or more clusters or to determine relationships between network addresses. To determine that two network addresses belong to the same cluster, the network address manager 112 may also use a proximity of the network addresses to each other (e.g., a numerical gap or distance between them), external data sources such as IP WHOIS, etc. In another example, the network address manager 112 may use a third asset (that can be for example, an email domain or a shipping address) that the two network addresses are associated with (e.g., by shared usage among one or more users or client devices) to determine that two network addresses belong to the same cluster.

In some embodiments, the network address manager 112 may use the usage history to determine relationship information between network addresses. The network address manager 112 may use the relationship information to generate a cluster of network addresses. When determining relationships between network addresses of devices conducting electronic activity for possible clustering, the network address manager 112 may access the network address information system 116 and/or the data storage 114 to obtain relationship information pertaining to a particular network address. For example, the network address manager 112 may determine that the first client device 104 and the second client device 118 may be related, such as part of a same subscription plan, owned by a single entity, associated with a single user, associated with multiple, related users, etc. In at least one embodiment, the network address manager 112 may identify relationship information between the first client device 104 and the second client device 118 from the usage history included in the data storage 114. For example, the network address manager 112 may query the first, second, third and/or fourth entries to determine that one user has previously been associated with the first client device 104 and the second client device 118. The network address manager 112 may also identify relationship information between the first client device 104 and the second client device 118 from other sources, such as a user manager, a cell phone provider (e.g., to determine client devices that are part of a same subscription plan), a corporate entity (e.g., to determine client devices that are owned by a single entity), etc.

In an example, the network address manager 112 may determine that the first client device 104 and the second client device 118 are related based on the usage history and/or from other sources. For example, the network address manager 112 may identify a first set of network addresses used by the first client device 104 and a second set of network addresses used by the second client device 118. In at least one embodiment, the network address manager 112 may cluster at least some of the first set of network addresses and the second set of network addresses. For example, the network address manager 112 may identify and cluster the network addresses that are in both the first set of network addresses and the second set of network addresses based on the relationship of the first client device 104 and the second client device 118. Additionally or alternatively, the network address manager 112 may identify and cluster all of the network addresses of the first set of network addresses and the second set of network addresses based on the relationship of the first client device 104 and the second client device 118.

The clustering may also be based at least in part on data, such as additional data. The additional data may include information from one or more external data sources. The information may include ownership information, geographic location, WHOIS data, user data, etc. The user data may include information pertaining to a user. For example, the user data may include an address associated with the user and/or past activity, including a list of previously used network addresses, etc.

In an example of using additional data for clustering, the network address manager 112 may cluster network addresses that are owned by a private corporation and have shared usage of a network address among multiple users. For example, the network address manager 112 may identify an owner of the first network address (e.g., private, corporate, or public owner), a type of network address for the first network address (e.g., internet service provider (ISP), mobile, spoof (e.g., proxy, virtual private network (VPN), TOR)), etc. The network address manager 112 may obtain information or data from the network address information system 116. In an example, the network address manager 112 may receive some or all of the information in the below Table 1 from the network address information system 116.

TABLE 1

Network Address Example

| Network Address | Country | Description |
| --- | --- | --- |
| 1410231698 | FR | France Bank |
| 1945707826 | IN | India Bank |
| 3226887206 | US | Global Bank |
| 3226887244 | US | Global Bank |
| 3226887245 | US | Global Bank |
| 3226887246 | US | Global Bank |
| 3226887247 | US | Global Bank |
| 3226887371 | US | Global Bank |

In the illustrated example, Table 1 includes three columns but Table 1 may include any number of columns. Further, in the illustrated example, Table 1 includes a network address column, a country column, and a description column. The description column may include any information pertaining to the network address, such as WHOIS information, owner information, owner type information, etc. As illustrated, the description column includes owner information. In an example, the network address information system 116 may cluster the network addresses 3226887206, 3226887244, 3226887245, 3226887246, 3226887247, and 3226887371 because of their common owner—Global Bank. In at least one embodiment, the Global Bank may be associated with all network addresses with the prefix "3226887." The network address information system 116 may cluster all network addresses with the prefix 3226887, which may include all network addresses between 3226887000 through 3226887999.

At a glance, the top two entries of the network addresses in Table 1 may appear somewhat unrelated to the other network addresses, particularly the network addresses for the France Bank and the India Bank. However, based on additional data collected and stored over time, the network address manager 112 may determine that each of the network addresses in Table 1 are related and may cluster these addresses as such. For example, the additional data may indicate that a same set of client devices and/or users use at least some of the network addresses of Table 1. In another example, the additional data may indicate that the Global Bank, the France Bank and the India Bank may be related, such as owned by a common company.

Table 2 illustrates an example cluster. As illustrated in Table 2, the network addresses from Table 1 may each be part of cluster ID 2351. Cluster ID 2351 may include more network addresses, as illustrated by the address ranges in Table 2.

TABLE 2

Network Address Cluster Example

| Cluster ID | Country | Start Address | End Address | Description |
| --- | --- | --- | --- | --- |
| 2351 | FR | 1410231696 | 1410231711 | France Bank |
| 2351 | IN | 1945698304 | 1945763839 | India Bank |
| 2351 | US | 3226886400 | 3226888959 | Global Bank |

In some embodiments, the network address manager 112 may mark some clusters as trusted clusters. A trusted cluster may include a set of network addresses that are related and are deemed to be reliable. In at least one embodiment, a system administrator may mark trusted clusters, such as by ownership information. For example, the system administrator may indicate that a well-known corporation may be trusted. The network address manager may accordingly mark a cluster of network addresses associated with the well-known corporation to be a trusted cluster.

As another example, the network address manager 112 may obtain data pertaining to suspicious or fraudulent activity for a set of network addresses in a cluster. In response to determining that suspicious or fraudulent activity from network addresses in the cluster is below a threshold value for a particular period of time, the network address manager 112 may mark the cluster as a trusted cluster. For example, the network address manager 112 may mark the cluster as a trusted cluster if the suspicious or fraudulent activity is zero or less than a amount or percentage, such as less than or about 10.0, 1.0, 0.1, 0.01, 0.001 or less. A cluster may be marked as a trusted cluster when it includes, for example, a set of IP addresses that have been used by multiple corporate users and are all registered as being owned by a corporate entity. Other criteria may be used to define a trusted cluster.

For example, in response to a network address being associated with a governmental entity, that network address may be included in a trusted cluster for that governmental entity. In at least one embodiment, some clusters may be marked as "not trusted," such as when the network address manager 112 determines that suspicious or fraudulent activity from network addresses in the cluster is above a threshold value for a particular period of time, such as an amount or percentage greater than or generally equal to about 0.001, 0.01, 0.1, 1.0, 10.0, or the like. The system administrator may also mark a cluster associated with a known fraudulent organization or region a "not trusted" cluster.

The network address manager 112 may generate a weighting factor between two or more network addresses. In some embodiments, the weighting factor may be indicative of a relationship between the two or more network addresses based on an amount of shared usage. In these or other embodiments, the weighting factor may include a numerical value that may be indicative of the relationship between the two or more network addresses based on the amount of shared usage. For example, as a number of occurrences of shared usage between network addresses in a cluster increases, the network address manager 112 may determine that these network addresses are more related and may update (e.g., increase) the weighting factor accordingly. In at least one embodiment, as the shared usage increases, the weighting factor may correspondingly increase. In at least one embodiment, the shared usage may increase linearly with the amount of shared usage. In at least one embodiment, the shared usage may increase exponentially or logarithmically based on the shared usage.

Some network addresses may have higher weighting factors with respect to each other based on a similarity of the network addresses. For example, a first IP address may be 92.16.1.100 and a second IP address may be 92.16.1.101. Because the first seven digits of the first IP address and the second IP address are identical, these two IP addresses may include a higher weighting factor because they likely are in a same network. In at least one embodiment, partial network addresses may be grouped. For example, the network address manager 112 may determine that an entity has been assigned a block of network addresses, such as all network addresses within 92.16.1.0 through 92.16.1.999. Network addresses within this range of network addresses may have higher weighting factors. In another example, two network addresses may belong to a single corporation and may be used by different users within the corporation. Those two network addresses may have a higher weighting factor between each other as compared to another weighting factor between a network address associated with a corporation and network address not associated with the corporation.

In some embodiments, the network address manager 112 may update a weighting factor between two or more network addresses over time. For example, two network addresses may be clustered based on a single shared usage between two different users and/or client devices. A single shared usage of the two network addresses may be associated with a lower weighting factor. As shared usage between the two network addresses increases, for example by an increased number of users and/or increased number of client devices, the weighting factor between the two network addresses may correspondingly increase. For example, the weighting factor between two network addresses may increase with any shared usage, such as shared usage of the two network addresses by the first client device 104 and the second client device 118. The weighting factor may further increase based on shared usage of the two network addresses by other devices, such as shared usage between a third device and a fourth device (both not illustrated). Further, a number of shared usage instances by any number of devices may increase the weighting factor. For example, fifty pairs of devices may each share the two network addresses once. The number of shared instances, e.g., fifty, may increase the weighting factor.

The weighting factor may correspond to a level of trust. In at least one embodiment, as the weighting factor between the two network addresses increases, so may a level of trust. For example, the first client device 104 may be associated with a first network address. The network address manager 112 may identify a request from the first client device 104 that includes the second network address. The network address manager 112 may determine that the weighting factor between the first network address and the second network address is relatively high. Because of the relatively high weighting factor between the first network address and the second network address, the network address manager 112 may determine that a level of trust for the request from the first client device 104 is also relatively high. In at least one embodiment, the level of trust and/or the weighting factor may increase or decrease linearly, exponentially, etc. In at least one embodiment, the level of trust may include a set of stepwise trust tiers where a first range of weighting factors corresponds to a first trust tier, a second range of weighting factors corresponds to a second trust tier, etc. In at least one embodiment, the network address manager 112 may compare a first weighting factor associated with the first network address with a second weighting factor associated with another network address in the same cluster. The network address manager 112 may determine an average weighting factor using the first weighting factor and the second weighting factor. In response to the average weighting factor being above a threshold value, network address manager 112 may include the first network address in a trusted cluster, and the trusted cluster may be a subset of the cluster. In another embodiment, the network address manager 112 may add any network address in the cluster with a minimum weighting factor value to the trusted cluster. Trusted clusters may be defined by the network address manager 112, for example, by counting a number of good transactions and/or other positive activity that were made using the network addresses of the cluster, by using whitelists, by using external data sources or by using other assets, (e.g., email domain or a shipping address) that may be linked to the clusters and can be used to characterized the cluster and determine a trustworthiness of the cluster.

The network address manager 112 may generate a network address map that includes one or more clusters of network addresses. The network address manager 112 may store the network address map in the data storage 114. In at least one embodiment, the network address map may include a graphical representation of relationships, clusters, and weighting factors between network addresses, which may be similar to the network address map of FIG. 3C. Alternatively or additionally, the network address map may include a table or matrix indicating relationships, weighting factors, etc. between network addresses. An example network address map is further described in conjunction with FIGS. 3A, 3B, and 3C.

Over time, the network address manager 112 may continue to refine and develop the clusters and determine network address ranges in the cluster. The network address manager 112 may continue to receive additional usage data from various client devices and may store the additional usage data with the usage history in the data storage 114. In at least one embodiment, the network address manager 112 may modify a weighting factor between the at least two network addresses based on the additional usage data. For example, the network address manager 112 may determine that two network addresses have a relatively high usage history between employee users associated with a private corporation and both of the network addresses are owned by the private corporation. The network address manager 112 may increase the weighting factor to reflect the shared usage by the employees and the common ownership of the two network addresses by the private corporations. In a similar example, the network address manager 112 may identify a third network address that also has a relatively high usage history between employee users but the third network address is owned by a coffee shop near the corporation headquarters. Because of the different ownership data, the weighting factor between the two network addresses and the third network address may be decreased. In another example, the additional data may include geographic information and the network address manager 112 may use the geographic information to modify the weighting factor between the at least two network addresses. For example, instead of or in addition to using the different ownership data to modify the weighting factor between the two network addresses and the third network address, the network address manager 112 may determine that the corporation headquarters has a different geographic location than the coffee shop. The network address manager 112 may use this difference to increase or decrease the weighting factor between the two network addresses and the third network address.

In at least one embodiment, the network address manager 112 may receive a request to initiate an electronic activity from the first client device 104. The request may include a first network address of the first client device 104. The request may include any type of request for any type of electronic activity, such as a request for a financial transaction, a request to send or post a message, etc.

In response to receiving the request, the network address manager 112 may identify a user associated with the request. In at least one embodiment, the network address manager 112 may determine whether the first client device 104 is logged into an account. In response to the first client device 104 being logged into the account, the network address manager 112 may identify the account as being associated with the request and the first network address. In response to the client device not being logged into an account, the network address manager 112 may request account credentials (e.g., username, password, biometrics) to log in to an account. Upon successful authentication, the network address manager 112 may identify the user and/or account.

In response to receiving the request to initiate the electronic activity from the first client device 104, the network address manager 112 may query the network address map in the data storage 114 to determine whether the first network address is in a cluster. In response to a determination that the first network is in a cluster, the network address manager 112 may grant the request to initiate the electronic activity. Granting the request may include determining that the request for the electronic activity does not include suspicious activity, which may be based on the first network address being in the trusted cluster. Determining that the request for the electronic activity does not include suspicious activity may also be based on the first client device 104 being previously been associated with the first network address. The network address manager 112 may also grant the request at least partially in view of a weighting factor and/or trust level. For example, the network address manager 112 may grant a request when a weighting factor associated with the first network address and another network address in the cluster is above a maximum threshold value. Granting the request may also include permitting the electronic activity based on a determination that the request for the electronic activity is unlikely to include (or does not include) suspicious activity because, for example, the network address is in the trusted cluster and, in some embodiments, also based on the weighting factor.

In response to the network address manager 112 determining that the first network address is not in a trusted cluster, the network address manager 112 may flag the first network address for possible later inclusion in a cluster. Through further processing and data analysis, the network address manager 112 may later determine to add the first network address to a cluster. For example, the network address manager 112 may later receive or identify additional data of shared usage of the first network address. The network address may be added to a corresponding cluster as a result of this additional data. In at least one embodiment, in response to the network address manager 112 determining that the first network address is not in a trusted cluster, the network address manager 112 may deny the request to initiate the electronic activity. For example, the network address manager 112 may deny the request to initiate the electronic activity based on a determination that the request for the electronic activity may include suspicious activity. The network address manager 112 may make such a determination in response to the first network address not being in a cluster and/or the weighting factor being below a threshold level.

Modifications, additions, or omissions may be made to the network architecture 100 without departing from the scope of the present disclosure. For example, embodiments of the network architecture 100 depicted in FIG. 1 include two client devices (e.g., client devices 104 and 118), two network devices (e.g., network devices 120 and 122), one server system 110, and one network address information system 116. The present disclosure, however, may more generally apply to the network architecture 100 including two or more client devices, two or more network devices, one or more servers, one or more network address information systems, or any combination thereof.

Moreover, the separation of various components in the embodiments described herein is not meant to indicate that the separation occurs in all embodiments. In addition, it may be understood with the benefit of this disclosure that the described components may be integrated together in a single component or separated into multiple components. For example, the first client device 104 or the second client device 118 may include a network device such as the first network device 120 or the second network device 122 included therein in some embodiments.

Figure 2:
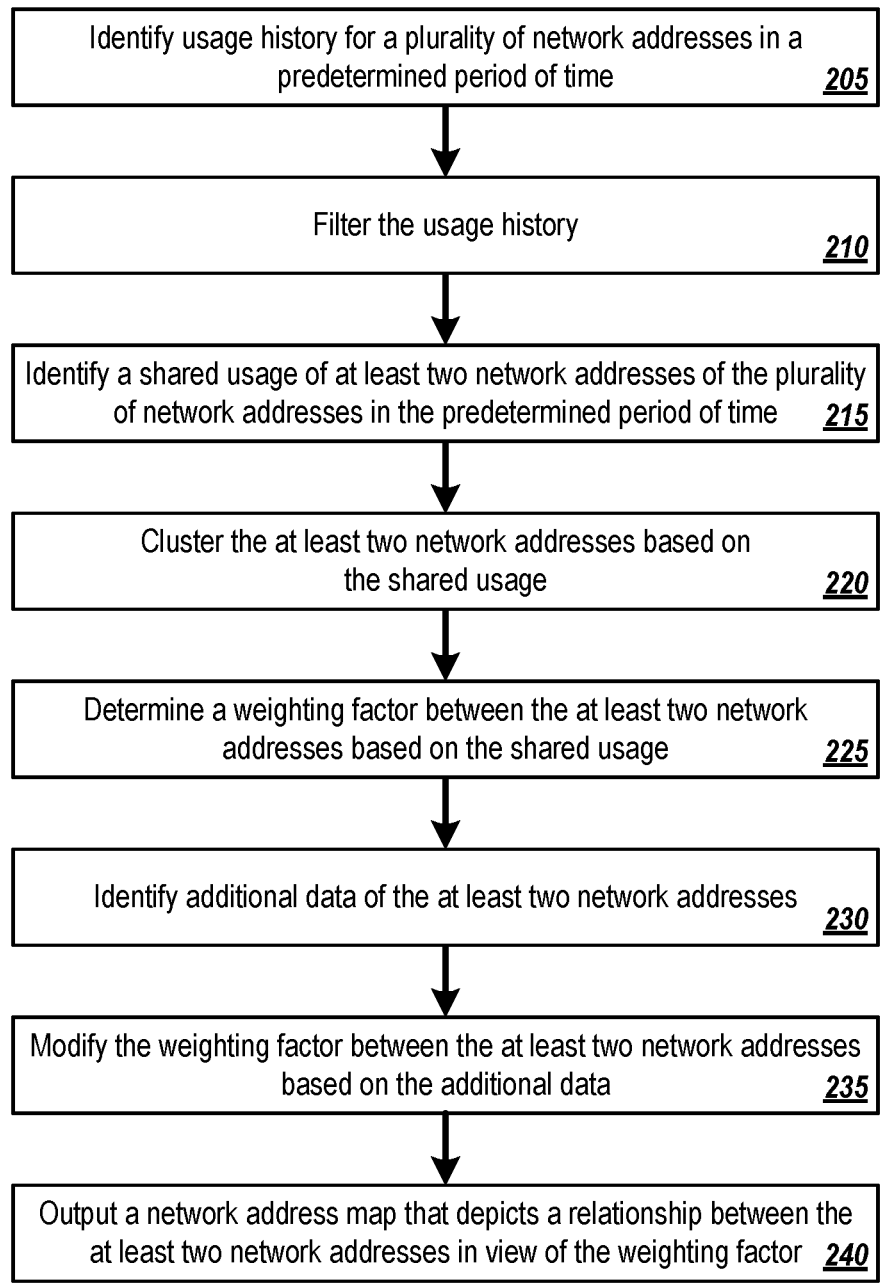
FIG. 2 illustrates a flow diagram of an example process to generate a network address map.
Figure 4:
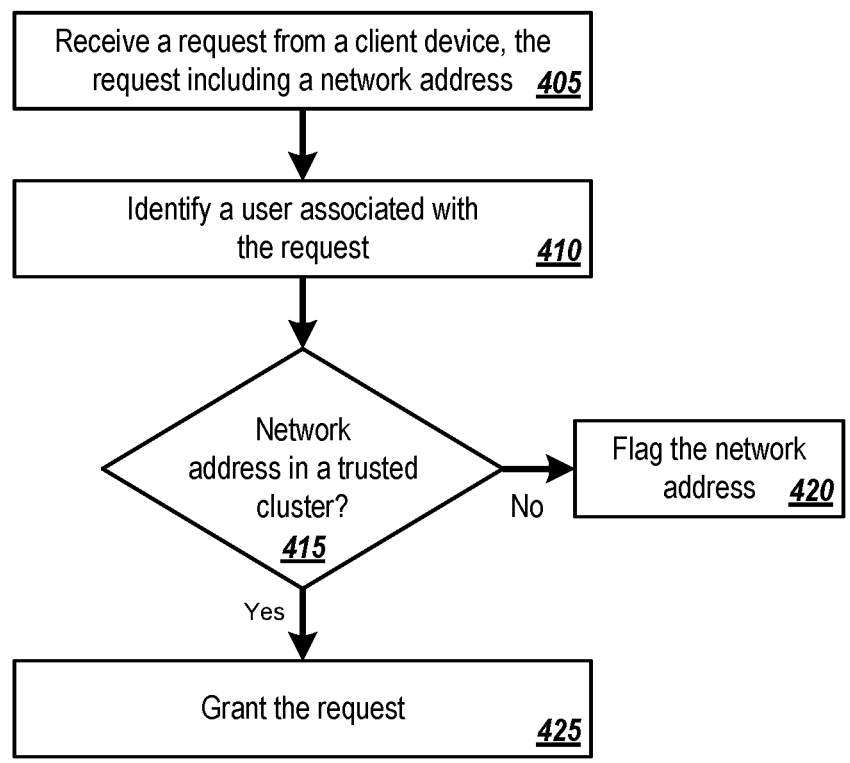
FIG. 4 illustrates a flow diagram of an example process to handle a request from a client device.

FIGS. 2 and 4 illustrate flow diagrams of example processes related to the creation and use of a network address map, which may include one or more clusters of network addresses. The address map may be represented on a map, geographically, numerically, in a diagram, or a combination thereof. The processes may be performed by processing logic that may include hardware (circuitry, dedicated logic, etc.), software (such as is run on a general purpose computer system or a dedicated machine), or a combination of both, which processing logic may be included in the network address manager 112 of FIG. 1 or another computer system or device. Another system, or combination of systems, may be used to perform the processes. For simplicity of explanation, processes described herein are depicted and described as a series of acts. However, acts in accordance with this disclosure may occur in various orders and/or concurrently, and with other acts not presented and described herein. Further, not all illustrated acts may be used to implement the processes in accordance with the disclosed subject matter. In addition, those skilled in the art may understand and appreciate that the processes may alternatively be represented as a series of interrelated states via a state diagram or events. Additionally, the processes disclosed in this specification are capable of being stored on an article of manufacture, such as a non-transitory computer-readable medium, to facilitate transporting and transferring such processes to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 2 illustrates a flow diagram of an example process 200 to generate a network address map. The process 200 may begin at block 205, where processing logic may identify usage history for multiple network addresses in a predetermined period of time. In some embodiments, the processing logic may be configured to generate the usage history.

At block 210, the processing logic may filter the usage history. The usage history may be filtered using various criteria. For example, some of the usage history may be tagged by a system administrator (or automatically) as being suspicious activity. Any usage history and/or network addresses associated with suspicious activity (e.g., current, prior) may be filtered out such that they may not be used to create a network address map under process 200.

At block 215, the processing logic may identify a shared usage of at least two network addresses of the multiple network addresses in the predetermined period of time. For example, the processing logic may determine that a first network address has been used by two different users during the predetermined period of time. In another example, the processing logic may determine that one user has used (or has been assigned) the network address on multiple occasions. In at least one embodiment, the multiple occasions may be separated by usage of another network address by the user. The processing logic may identify shared usage by any number of users.

At block 220, the processing logic may cluster related network addresses in the network address map. The processing logic may cluster related network addresses based on any criteria, such as shared usage of a network address among multiple users or by multiple client devices. For example, the processing logic may cluster two or more network addresses that have each been associated with the same users or client devices. The clustering may also be based on additional data, such as network address ownership data, common WHOIS data, etc.

At block 225, the processing logic may determine a weighting factor between the two network addresses based on the shared usage, as described above. At block 230, the processing logic may identify additional usage data of the two network addresses. The additional data may include a geographic location associated with a network address, an organization or owner of the network address (e.g., university, private house, company), whether the owner has previously used the network address, among other data. In at least one embodiment, the processing logic may access a remote server (e.g., the network address information system 116 of FIG. 1) to obtain the additional data. The remote server, for example, may include a WHOIS, RDNS, ASN, or similar server that provides information about a network address. At block 235, the processing logic may modify the weighting factor between the at least two network addresses based on the additional usage data, as further described above with respect to FIG. 1.

At block 240, the processing logic may output a network address map that depicts a relationship between the at least two network addresses in view of the weighting factor. In at least one embodiment, the processing logic may continue to refine and/or update the network address map after generating the network address map.

Figure 3A:
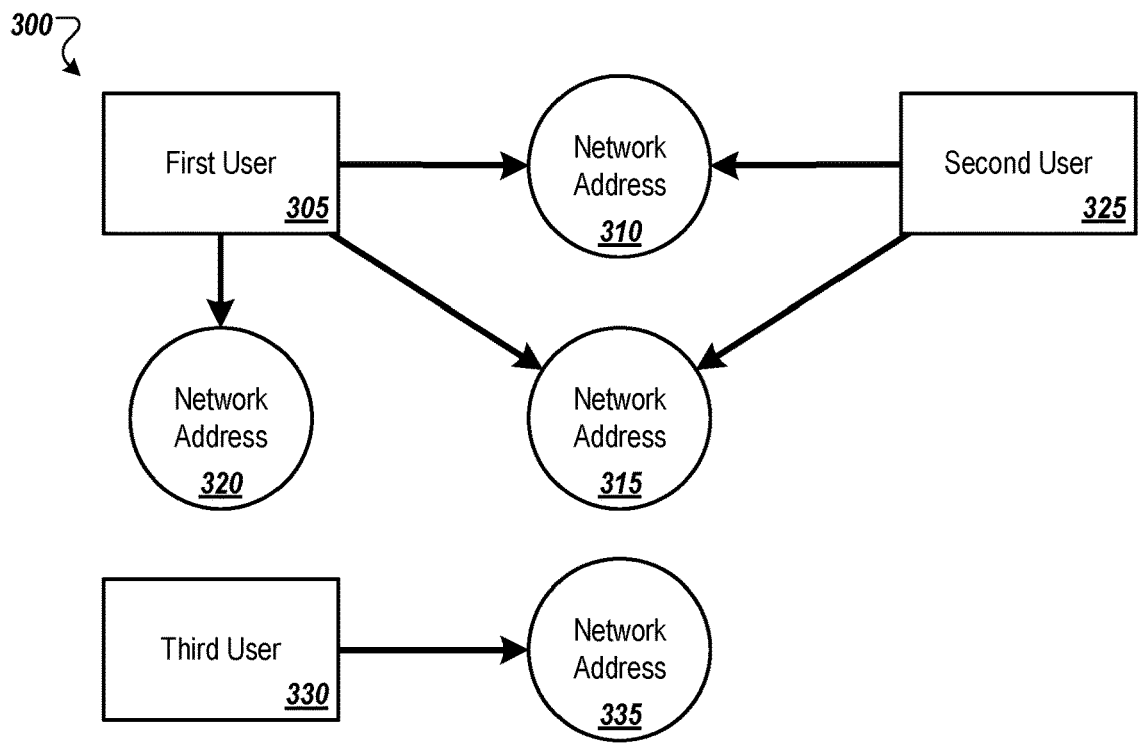
FIGS. 3A and 3B illustrate an example network address map.
Figure 3B:
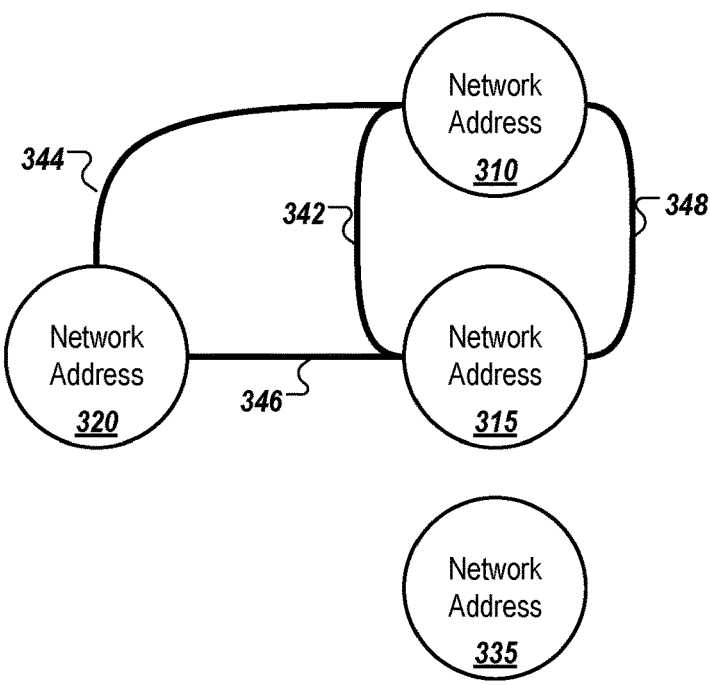

FIGS. 3A and 3B illustrate an example network address map. While FIGS. 3A and 3B are described with respect to one or more user users, the description may also be applicable to other aspects, such as one or more client devices. In FIG. 3A, processing logic (which may be part of the network address manager 112 of FIG. 1) may identify a first user 305. The first user 305 may include a user account, as further described above. The processing logic may identify one or more network addresses associated with the first user 305. The network addresses may be associated with the first user 305 within a predetermined period of time, such as the most recent six months, or any other period of time. In the illustrated example, the first user 305 is associated with a first network address 310, a second network address 315, and a third network address 320 during the predetermined period of time.

The processing logic may also identify a second user 325. The second user 325 may be associated with any number of network addresses. In the illustrated example, the second user 325 is associated with the first network address 310 and the second network address 315 during the predetermined period of time.

The processing logic may also identify a third user 330. The third user 330 may be associated with any number of network addresses. In the illustrated example, the third user 330 is associated with a fourth network address 335 during the predetermined period of time.

As illustrated in FIG. 3B, the processing logic may cluster network addresses with shared usage during the predetermined period of time. For example, the processing logic may cluster the first network address 310 with the second network address 315 and the third network address 320 (illustrated by lines 342, 344 and 346), based on shared usage by the first user 305. Similarly, the processing logic may cluster the first network address 310 with the second network address 315 (illustrated by line 348), based on shared usage by the second user 325.

Figure 3C:
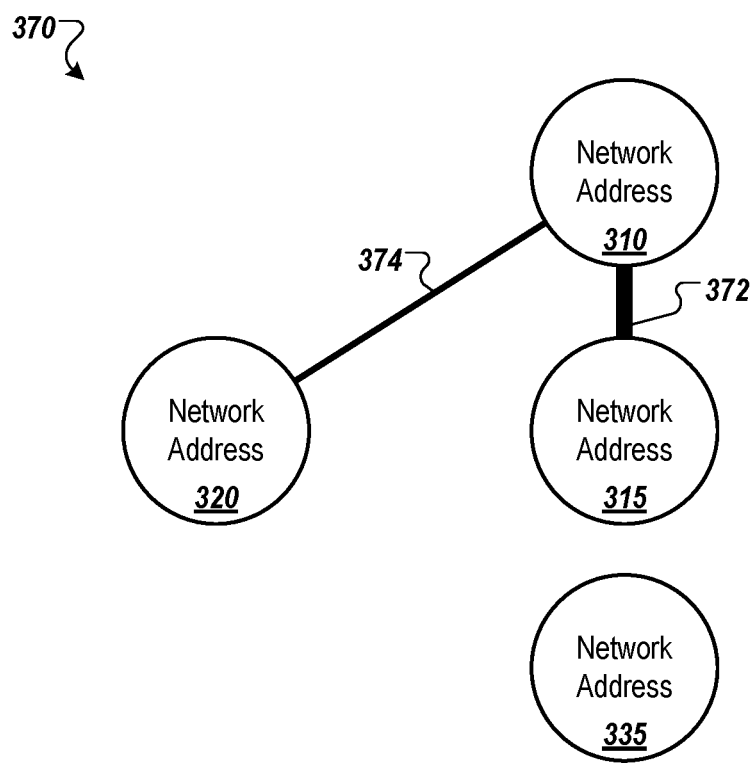
FIG. 3C illustrates generation of a weighting factor based on shared usage of network addresses between multiple users.

FIG. 3C illustrates generation of a weighting factor based on shared usage of network addresses between multiple users. The generation of the weighting factor described in conjunction with FIG. 3C is one example of how to generate the weighting factor. The weighting factor may be based on any data, such as the data described above with respect to FIG. 2.

From FIGS. 3A and 3B, it is illustrated that the first network address 310 and the second network address 315 were both used by the first user 305 and the second user 325 during the predetermined period of time. Thus, the processing logic may create a weighting factor between the first network address 310 and the second network address 315 that may be indicative of this relationship. As illustrated, the line 372 is a thicker line weight as opposed to the line weight of line 374, which may indicate that the line 372 represents a greater weighting factor for the line 372 as compared to the lesser weighting factor of line 374.

Although FIGS. 3A, 3B and 3C are described with respect to various graphical representations of weighting factors, the weighting factors between network addresses may also be represented numerically. In at least one embodiment, an n×m matrix may represent weighting factors between network addresses, where the respective weighting factor is numerically represented in the corresponding entry of the matrix. For example, the weighting factor between network addresses i and j may be stored at entry i,j in the matrix. Tables, charts, and relational databases, among other techniques, may be used.

FIG. 4 illustrates a flow diagram of an example process 400 to handle a request from a client device. The process 400 may begin at block 405, where processing logic may receive a request for an electronic activity from a client device. The request may include a network address (e.g., an IP address).

At block 410, the processing logic may identify a user associated with the request. In at least one embodiment, the processing logic may determine whether the client device is logged into an account. In response to the client device being logged into the account, the processing logic may identify the account as being associated with the request and network address. In response to the client device not being logged into an account, the processing logic may request account credentials (e.g., username, password, biometrics) to log in to an account. Upon successful authentication, the processing logic may identify the user.

At block 415, the processing logic may determine whether the network address is in a trusted cluster. In response to the processing logic determining that the network address is in a trusted cluster ("YES" at block 415), at block 425 the processing logic may grant the request received at block 405.

In response to the processing logic determining that the network address is not in a trusted cluster ("NO" at block 415), at block 420 the processing logic may flag the network address for possible later inclusion in a cluster. Through further processing and data analysis, the processing logic may later determine to add the network address to a cluster. For example, the processing logic may later receive additional data of shared usage of the network address. The network address may be added to the cluster as a result of this additional data.

Figure 5:
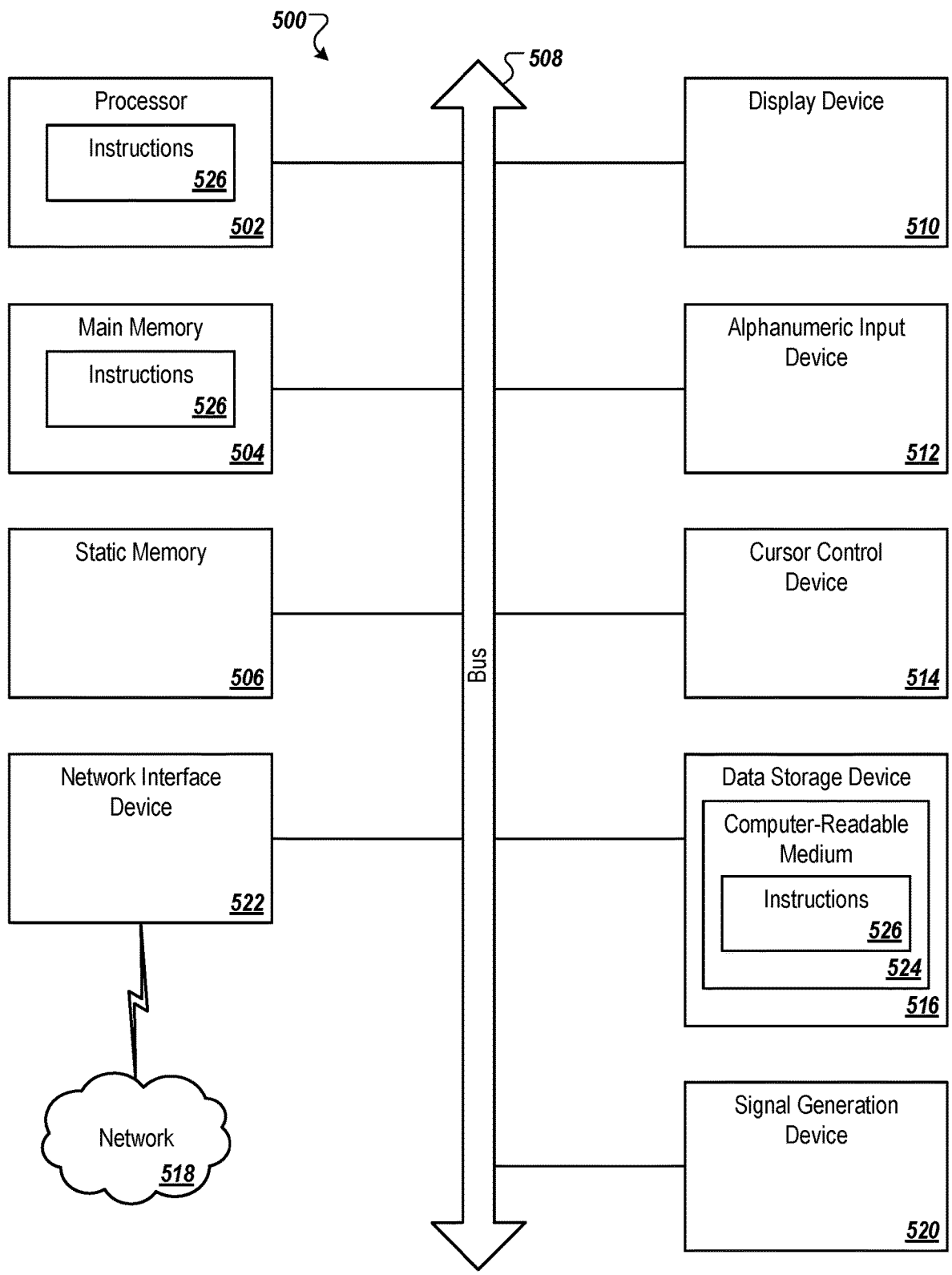
FIG. 5 illustrates a diagrammatic representation of a machine in the example form of a computing device within which a set of instructions, for causing the machine to perform any one or more of the processes discussed herein, may be executed.

FIG. 5 illustrates a diagrammatic representation of a machine in the example form of a computing device 500 within which a set of instructions, for causing the machine to perform any one or more of the processes discussed herein, may be executed. The computing device 500 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the processes discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the processes discussed herein.

The example computing device 500 includes a processing device (e.g., a processor) 502, a main memory 504 (e.g., read-only memory (ROM), flash memory, dynamic random access memory (DRAM), as synchronous DRAM (SDRAM)), a static memory 506 (e.g., flash memory, static random access memory (SRAM)) and a data storage device 516, which communicate with each other via a bus 508.

Processing device 502 represents one or more general-purpose processing devices such as a microprocessor, central processing unit, or the like. More particularly, the processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also include one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computing device 500 may further include a network interface device 522 which may communicate with a network 518. The computing device 500 also may include a display device 510 (e.g., a liquid crystal display (LCD) or a cathode ray tube (CRT)), an alphanumeric input device 512 (e.g., a keyboard), a cursor control device 514 (e.g., a mouse) and a signal generation device 520 (e.g., a speaker). In at least one embodiment, the display device 510, the alphanumeric input device 512, and the cursor control device 514 may be combined into a single component or device (e.g., an LCD touch screen).

The data storage device 516 may include a computer-readable storage medium 524 on which is stored one or more sets of instructions 526 (e.g., network address manager 112) embodying any one or more of the processes or functions described herein. The instructions 526 may also reside, completely or at least partially, within the main memory 504 and/or within the processing device 502 during execution thereof by the computing device 500, the main memory 504 and the processing device 502 also constituting computer-readable media. The instructions may further be transmitted or received over a network 518 via the network interface device 522.

While the computer-readable storage medium 526 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the processes of the present disclosure. The term "computer-readable storage medium" may accordingly be taken to include, but not be limited to, solid-state memories, optical media and magnetic media.

Terms used herein and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an"

limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and processes described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it may be understood that the various changes, substitutions, and alterations may be made hereto without departing from the spirit and scope of the present disclosure.

What is claimed is:

1. A method comprising:

identifying a shared usage of a first network address and a second network address based on a usage history of a plurality of network addresses that includes the first network address and the second network address, wherein the identifying the shared usage of the first network address and the second network address further comprises identifying one or more network addresses as being associated with fraudulent activity, wherein the plurality of network addresses is determined based on filtering out the identified one or more network addresses from a set of network addresses that includes the plurality of network addresses;

associating the first network address and the second network address with each other based on the shared usage;

receiving a request for an electronic activity from a client device, the request including the second network address, wherein the client device has previously been associated with the first network address and has not previously been associated with the second network address;

determining that the request for the electronic activity from the client device does not include suspicious activity based on the first network address and the second network address being associated with each other; and permitting the electronic activity based on the determination that the request for the electronic activity does not include suspicious activity.

2. The method of claim 1, wherein identifying the shared usage of the first network address and the second network address comprises identifying a device that is associated with both the first network address and the second network address.

3. The method of claim 1, wherein identifying the shared usage of the first network address and the second network address comprises identifying at least two users or devices that both used the first network address and the second network address.

4. The method of claim 1 further comprising identifying additional data related to the first network address and the second network address, the additional data comprising at least one data type selected from a group of data types consisting of: ownership data of the first network address, ownership data of the second network address, geographical location data of the first network address, and geographical location data of the second network address, wherein determining that the request for the electronic activity from the client device does not include suspicious activity is further based on the additional data.

5. The method of claim 4, wherein the additional data includes data that indicates that the first network address is associated with a first owner and the second network address is associated with a second owner.

6. The method of claim 4, wherein associating the first network address and the second network address with each other includes adding the first network address and the second network address to a trusted cluster of network addresses based on the additional data, and wherein determining that the request for the electronic activity from the client device does not include suspicious activity is based on the first network address and the second network address being in the trusted cluster of network addresses.

7. Non-transitory computer-readable storage media configured to store instructions that cause a system to perform operations, the operations comprising:
obtaining a usage history of a plurality of network addresses, the plurality of network addresses including a first network address and a second network address;
filtering out at least some of the usage history that includes fraudulent activity;
identifying a shared usage of a first network address and a second network address based on the filtered usage history;
associating the first network address and the second network address with each other based on the shared usage;
receiving a request for an electronic activity from a client device, the request including the second network address, wherein the client device has previously been associated with the first network address and has not previously been associated with the second network address;
determining that the request for the electronic activity from the client device does not include suspicious activity based on the first network address and the second network address being associated with each other; and
permitting the electronic activity based on the determination that the request for the electronic activity does not include suspicious activity.

8. The non-transitory computer-readable storage media of claim 7, wherein the electronic activity is permitted based on a determination that the request for the electronic activity does not include suspicious activity, the determination being in response to the first network address being in a cluster of network addresses.

9. The non-transitory computer-readable storage media of claim 7, wherein the electronic activity is denied based on a determination that the request for the electronic activity includes suspicious activity, the determination being in response to the second network address not being in a cluster of network addresses.

10. The non-transitory computer-readable storage media of claim 7, the operations further comprising identifying additional data related to the first network address and the second network address, wherein the additional data comprises at least one data type selected from a group of data types consisting of: ownership data of the first network address, ownership data of the second network address, geographical location data of the first network address, and geographical location data of the second network address, wherein determining that the request for the electronic activity from the client device does not include suspicious activity is further based on the additional data.

11. The non-transitory computer-readable storage media of claim 10, wherein the additional data includes data that indicates that the first network address is associated with a first owner and the second network address is associated with a second owner.

12. The non-transitory computer-readable storage media of claim 10, wherein associating the first network address and the second network address with each other includes adding the first network address and the second network address to a trusted cluster of network addresses based on the additional data, and wherein determining that the request for the electronic activity from the client device does not include suspicious activity is based on the first network address and the second network address being in the trusted cluster of network addresses.

13. A system comprising:
a memory; and
a processing device operatively coupled to the memory, the processing device being configured to:
identify a shared usage of a first network address and a second network address based on a usage history of the first network address and the second network address, wherein the identifying the shared usage of the first network address and the second network address further comprises identifying one or more network addresses as being associated with fraudulent activity, wherein the plurality of network addresses is determined based on filtering out the identified one or more network addresses from a set of network addresses that includes the plurality of network addresses;
associate the first network address and the second network address with each other based on the shared usage;
receive a request for an electronic activity from a client device, the request including the second network address, wherein the client device has previously been associated with the first network address and has not previously been associated with the second network address;
determine that the request for the electronic activity from the client device does not include suspicious activity based on the first network address and the second network address being associated with each other and based on the client device having previously been associated with the first network address; and
permit the electronic activity based on the determination that the request for the electronic activity does not include suspicious activity.

14. The system of claim 13, wherein identifying the shared usage of the first network address and the second network address comprises identifying a device that is associated with both the first network address and the second network address.

15. The system of claim 13, wherein when identifying the shared usage of the first network address and the second network address, the processing device is configured to identify at least two users or devices that both used the first network address and the second network address in a predetermined period of time.

16. The system of claim 13, the processing device being further configured to identify additional data related to the first network address and the second network address, wherein the additional data comprises at least one data type selected from a group of data types consisting of: ownership data of the first network address, ownership data of the second network address, geographical location data of the first network address, and geographical location data of the second network address, wherein determining that the request for the electronic activity from the client device does not include suspicious activity is further based on the additional data.

17. The system of claim 16, wherein the additional data includes data that indicates that the first network address is associated with a first owner and the second network address is associated with a second owner.

18. The system of claim 16, wherein associating the first network address and the second network address with each other includes adding the first network address and the second network address to a trusted cluster of network addresses based on the additional data, and wherein determining that the request for the electronic activity from the client device does not include suspicious activity is based on the first network address and the second network address being in the trusted cluster of network addresses.

* * * * *